United States Patent
Tong et al.

(10) Patent No.: US 7,149,368 B2
(45) Date of Patent: Dec. 12, 2006

(54) SYSTEM AND METHOD FOR SYNTHESIS OF BIDIRECTIONAL TEXTURE FUNCTIONS ON ARBITRARY SURFACES

(75) Inventors: Xin Tong, Beijing (CN); Ligang Liu, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 10/299,623

(22) Filed: Nov. 19, 2002

(65) Prior Publication Data

US 2004/0096120 A1   May 20, 2004

(51) Int. Cl.
G06K 9/36   (2006.01)
(52) U.S. Cl. .................. 382/285; 382/254; 382/302
(58) Field of Classification Search ............... 382/285, 382/254, 302; 345/582, 586, 588, 419; 356/446
See application file for complete search history.

(56) References Cited

U.S. PATENT DOCUMENTS

| | | | | |
|---|---|---|---|---|
| 5,872,867 | A * | 2/1999 | Bergen | 382/254 |
| 6,177,034 | B1 * | 1/2001 | Ferrone | 264/40.1 |
| 6,700,585 | B1 * | 3/2004 | Ritter | 345/582 |
| 6,760,488 | B1 * | 7/2004 | Moura et al. | 382/285 |
| 6,864,897 | B1 * | 3/2005 | Brand | 345/582 |
| 6,947,055 | B1 * | 9/2005 | Ritter | 345/588 |
| 6,987,568 | B1 * | 1/2006 | Dana | 356/446 |
| 7,002,592 | B1 * | 2/2006 | Horton et al. | 345/582 |
| 7,006,103 | B1 * | 2/2006 | Horton | 345/586 |
| 2003/0206176 | A1 * | 11/2003 | Ritter | 345/582 |
| 2004/0001059 | A1 * | 1/2004 | Pfister et al. | 345/419 |

OTHER PUBLICATIONS

Ashikhmin, M. 2001. Synthesizing natural textures. *ACM Symposium on Interactive 3D Graphics*, 217-226.
Bar-Joseph, Z., El-Yaniv, R., Lischinski, D., and Werman, M. 2001. Texture mixing and texture movie synthesis using statistical learning. *IEEE Transactions on Visualization and Computer Graphics 7*, 2, 120-135.
Beier, T., and Neely, S. 1992. Feature-based image metamorphosis. *Computer Graphics (Proceedings of SIGGRAPH 92) 26*, 2 (Jul.), 35-42.
Brooks, S., and Dodgson, N. 2002. Self-similarity based texture editing. *ACM Transactions on Graphics 21*, 3 (Jul.), 653-656. (Proceedings of ACM SIGGRAPH 2002).
Dischler, J., Maritaud, K., L evy, B., and Ghazanfarpour, D. 2002. Texture particles. *Computer Graphics Forum 21*, 3, 401-410.

(Continued)

*Primary Examiner*—Sanjiv Shah
(74) *Attorney, Agent, or Firm*—Lyon & Harr, LLP; Mark A. Watson

(57) ABSTRACT

A bidirectional texture function (BTF) synthesizer serves to synthesize BTFs on arbitrary manifold surfaces using "surface textons" given a sample BTF as an input. The synthesized BTFs fit the surface geometry naturally and seamlessly, and not only look similar to a sample BTF in all viewing and lighting conditions, but also exhibit a consistent mesostructure when the viewing and lighting directions change. Further, the synthesized BTFs capture the fine-scale shadows, occlusions, and specularities caused by surface mesostructures, thereby improving the perceived realism of the textured surfaces. In addition, the BTF synthesizer can describe real-world textures to allow a user to decorate real-world geometry with real-world textures. Finally, BTF synthesis using surface textons works well for any materials that can be described by three-dimensional textons.

20 Claims, 6 Drawing Sheets
(2 of 6 Drawing Sheet(s) Filed in Color)

OTHER PUBLICATIONS

Efros, A. A., and Freeman, W. T. 2001. Image quilting for texture synthesis and transfer. In *Proceedings of ACM SIGGRAPH 2001*, Computer Graphics Proceedings, Annual Conference Series, 341-346.

Efros, A. A., and Leung, T. K. 1999. Texture synthesis by non-parametric sampling. In *Proceedings of International Conference on Computer Vision*.

Gomes, J., Costa, B., Darsa, L., and Velho, L. 1998. *Warping and Morphing of Graphics Objects*. Morgan Kaufmann.

Gorla, G., Interrante, V., and Sapiro, G. 2001. Growing fitted textures. *SIGGRAPH 2001 Sketches and Applications* (Aug.), 191.

Guo, C., Zhu, S. C., and Wu, Y.-N. 2001. Visual learning by integrating descriptive and generative methods. In *Proceedings of International Conference on Computer Vision (ICCV)*, 370-377.

Harrison, P. 2001. A non-hierarchical procedure for synthesis of complex textures. In *Proceedings of Winter School of Computer Graphics*.

Hertzmann, A., Jacobs, C. E., Oliver, N., Curless, B., and Salesin, D. H. 2001. Image analogies. *Proceedings of SIGGRAPH 2001* (Aug.), 327-340.

Leung, T. K., and Malik, J. 1996. Detecting, localizing and grouping repeated scene elements from an image. In *Proceedings of European Conference on Computer Vision*.

Liang, L., Liu, C., Xu, Y., Guo, B., and Shum, H.-Y. 2001. Real-time texture synthesis using patch-based sampling. *ACM Transactions on Graphics 20*, 3 (Jul.).

Liu, Z., Liu, C., Shum, H.-Y., and Yu, Y. 2002. Pattern-based texture metamorphosis. In *Proceedings of Pacific Graphics*, 184-191.

Malik, J., Belongie, S., Shi, J., and Leung, T. 1999. Textons, contours and regions: cue integration in image segmentation. In *Proceedings of International Conference on Computer Vision (ICCV)*, 918-925.

Mallat, S., Papanicolaou, G., and Zhang, Z. 1998. Adaptive covariance estimation of locally stationary processes. *Annals of Statistics 26*, 1, 1-47.

Praun, E., Finkelstein, A., and Hoppe, H. 2000. Lapped textures. *Proceedings of SIGGRAPH 2000* (Jul.), 465-470.

Soler, C., Cani, M.-P., and Angelidis, A. 2002. Hierarchical pattern mapping. *ACM Transactions on Graphics 21*, 3 (Jul.), 673-680. (Proceedings of ACM SIGGRAPH 2002).

Suzuki, S., and Abe, K. 1985. Topological structural analysis of digital binary images by border following. *Computer Vision, Graphics, and Image Processing 30*, 1, 32-46.

Tonietto, L., and Walter, M. 2002. Towards local control for image-based texture synthesis. In *Proceedings of SIBGRAPI 2002—XV Brazilian Symposium on Computer Graphics and Image Processing*.

Turk, G. 1991. Generating textures for arbitrary surfaces using reaction-diffusion. *Computer Graphics (Proceedings of SIGGRAPH 91) 25*, 4 (Jul.), 289-298.

Turk, G. 2001. Texture synthesis on surfaces. *Proceedings of SIGGRAPH 2001* (Aug.), 347-354.

Walter, M., Fournier, A., and Menevaux, D. 2001. Integrating shape and pattern in mammalian models. *Proceedings of SIGGRAPH 2001* (Aug.), 317-326.

Wei, L.-Y., and Levoy, M. 2000. Fast texture synthesis using tree-structured vector quantization. *Proceedings of SIGGRAPH 2000* (Jul.), 479-488.

Wei, L.-Y., and Levoy, M. 2001. Texture synthesis over arbitrary manifold surfaces. *Proceedings of SIGGRAPH 2001* (Aug.), 355-360.

Wei, L.-Y. 2001. *Texture Synthesis by Fixed Neighborhood Searching*. Ph.D. Dissertation, Stanford University.

Witkin, A., and Kass, M. 1991. Reaction-diffusion textures. *Computer Graphics (Proceedings of SIGGRAPH 91) 25*, 4 (Jul.), 299-308.

Ying, L., Hertzmann, A., Biermann, H., And Zorin, D. 2001. Texture and shape synthesis on surfaces. *Proceedings of 12th Eurographics Workshop on Rendering* (Jun.), 301-312.

Zalesny, A., Ferrari, V., Caenen, G., Der Maur, D. A., and Gool, L. V. 2002. Composite texture descriptions. In *Proceedings of ECCV*, vol. 3, 341-346.

Zhu, S., Wu, Y., and Mumford, D. 1998. Filters random fields and maximum entropy (frame). *International Journal of Computer Vision 27*, 2 (Mar.), 107-126.

Sunil Arya, David Mount, Nathan Netanyahu, Ruth Silverman, and Angela Wu. An optimal algorithm for approximate nearest neighbor searching. *Journal of the ACM*, 45:891-923, 1998.

Oana G. Cula and Kristin J. Dana. Compact representation of bidirectional texture functions. In *Proceedings of IEEE Conference on Computer Vision and Pattern Recognition*, Dec. 2001.

Brian Curless and Marc Levoy. A volumetric method for building complex models from range images. In *Proceedings of SIGGRAPH 96*, Computer Graphics Proceedings, Annual Conference Series, pp. 303-312, New Orleans, Louisiana, Aug. 1996.

Kristin J. Dana and Shree Nayar. 3d textured surface modeling. In *Proceedings of IEEE Workshop on the Integration of Appearance and Geometric Methods in Object Recognition*, pp. 46-56, Jun. 1999.

Kristin J. Dana, Bram van Ginneken, Shree K. Nayar, and Jan J. Koenderink. Reflectance and texture of real-world surfaces. *ACM Transactions on Graphics*, 18(1):1-34, Jan. 1999.

Paul E. Debevec, Yizhou Yu, and George D..Borshukov. Efficient view dependent image-based rendering with projective texture-mapping. *Eurographics Rendering Workshop 1998*, pp. 105-116, Jun. 1998.

Pei hsiu Suen and Glenn Healey. The analysis and recognition of real-world textures in 3d. *IEEE Transactions on Patten Analysis and Machine Intelligence*, 22(5):491-503, May 2000.

Jan J. Koenderink and Andrea J. Van Doorn. Illuminance texture due to surface mesostructure. *Journal of the Optical Society of America*, 13(3):452-463, 1996.

Thomas Leung and Jitendra Malik. Representing and recognizing the visual appearance of materials using 3d textons. *International Journal of Computer Vision*, 43(1):29-44, Jun. 2001.

Xinguo Liu, Yizhou Yu, and Heung-Yeung Shum. Synthesizing bidirectional texture functions for real-world surfaces. *Proceedings of SIGGRAPH 2001*, pp. 97-106, Aug. 2001.

Jerome Maillot, Hussein Yahia, and Anne Verroust. Interactive texture mapping. *Proceedings of SIGGRAPH 93*, pp. 27-34, Aug. 1993.

Tom Malzbender, Dan Gelb, and Hans Wolters. Polynomial texture maps. *Proceedings of SIGGRAPH 2001*, pp. 519-528, Aug. 2001.

Greg Turk. Re-tiling polygonal surfaces. *Computer Graphics (Proceedings of SIGGRAPH 92)*, 26(2):55-64, Jul. 1992.

Daniel N. Wood, Daniel I. Azuma, Ken Aldinger, Brian Curless, Tom Duchamp, David H. Salesin, and Werner Stuetzle. Surface light fields for 3d photography. In *Proceedings of SIGGRAPH 2000*, Computer Graphics Proceedings, Annual Conference Series, pp. 287-296, Jul. 2000.

Lexing Ying, Aaron Hertzmann, Henning Biermann, and Denis Zorin. Texture and shape synthesis on surfaces. *Proceedings of 12th Eurographics Workshop on Rendering*, pp. 301-312, Jun. 2001.

Bryan P. Bergeron. Morphing as a means of generating variability in visual medical teaching materials. *Computers in Biology and Medicine*, 24:11-18, Jan. 1994.

Chris Buehler, Michael Bosse, Leonard McMillan, Steven J. Gortler, and Michael F. Cohen. Unstructured lumigraph rendering. *Proceedings of SIGGRAPH 2001*, pp. 425-432, Aug. 2001.

Shenchang Eric Chen and Lance Williams. View interpolation for image synthesis. *Proceedings of SIGGRAPH 93*, pp. 279-288, Aug. 1993.

Daniel Cohen-Or, Amira Solomovici, and David Levin. Three-dimensional distance field metamorphosis. *ACM Transactions on Graphics*, 17(2):116-141, Apr. 1998. ISSN 07300301.

Douglas DeCarlo and Jean Gallier. Topological evolution of surfaces. *Graphics Interface '96*, pp. 194-203, May 1996.

Julie Dorsey and Pat Hanrahan. Modeling and rendering of metallic patinas. *Proceedings of SIGGRAPH 96*, pp. 387-396, Aug. 1996.

Steven J. Gortler, Radek Grzeszczuk, Richard Szeliski, and Michael F. Cohen. The lumigraph. *Proceedings of SIGGRAPH 96*, pp. 43-54, Aug. 1996.

Arthur Gregory, Andrei State, Ming C. Lin, Dinesh Manocha, and Mark A. Livingston. Interactive surface decomposition for polyhedral morphing. *The Visual Computer*, 15(9):453-470, 1999.

John F. Hughes. Scheduled fourier volume morphing. *Computer Graphics (Proceedings of SIGGRAPH 92)*, 26(2):43-46, Jul. 1992.

James R. Kent, Wayne E. Carlson, and Richard E. Parent. Shape transformation for polyhedral objects. *Computer Graphics (Proceedings of SIGGRAPH 92)*, 26(2):47-54, Jul. 1992.

Francis Lazarus and Anne Verroust. Three-dimensional metamorphosis: a survey. *The Visual Computer*, 14(89):373-389, 1998.

Aaron Lee, David Dobkin, Wim Sweldens, and Peter Schroder. Multiresolution mesh morphing. *Proceedings of SIGGRAPH 99*, pp. 343-350, Aug. 1999.

Apostolos Lerios, Chase D. Garfinkle, and Marc Levoy. Feature-based volume metamorphosis. *Proceedings of SIGGRAPH 95*, pp. 449-456, Aug. 1995.

Marc Levoy. Expanding the horizons of image-based modeling and rendering. In *SIGGRAPH 97 Panel:Image-based Rendering:Really New or Deja Vu*, 1997.

Marc Levoy and Pat Hanrahan. Light field rendering. *Proceedings of SIGGRAPH 96*, pp. 31-42, Aug. 1996.

Wojciech Matusik, Chris Buehler, Ramesh Raskar, Steven J. Gortler, and Leonard McMillan. Image-based visual hulls. In *Proceedings of ACM SIGGRAPH 2000*, Computer Graphics Proceedings, Annual Conference Series, pp. 369-374, Jul. 2000.

Steven M. Seitz and Charles R. Dyer. View morphing: Synthesizing 3d metamorphoses using image transforms. *Proceedings of SIGGRAPH 96*, pp. 21-30, Aug. 1996.

Steven M. Seitz and Kiriakos N. Kutulakos. Plenoptic image editing. In *ICCV98*, pp. 17-24, 1998.

Jonathan Shade, Steven J. Gortler, Li wei He, and Richard Szeliski. Layered depth images. In *Proceedings of SIGGRAPH 98*, Computer Graphics Proceedings, Annual Conference Series, pp. 231-242, Orlando, Florida, Jul. 1998.

HeungYeung Shum and LiWei He. Rendering with concentric mosaics. *Proceedings of SIGGRAPH 99*, pp. 299-306, Aug. 1999. ISBN 0201485605. Held in Los Angeles, California.

Laszlo Szirmay-Kalos and Werner Purgathofer. Global raybundle tracing with hardware acceleration. *Eurographics Rendering Workshop 1998*, pp. 247-258, Jun. 1998.

George Wolberg. Image morphing: a survey. *The Visual Computer*, 14(89):360-372, 1998.

* cited by examiner

SYSTEM AND METHOD FOR SYNTHESIS OF BIDIRECTIONAL TEXTURE FUNCTIONS ON ARBITRARY SURFACES

BACKGROUND

1. Technical Field

The invention is related to synthesizing textures for arbitrary surfaces, and in particular, to a system and method for computationally efficient synthesis of bidirectional texture functions (BTF) on arbitrary surfaces given natural or synthetic BTF samples as inputs.

2. Related Art

Generating textures on arbitrary surfaces has been an active area of research. One approach is to simply map pre-computed texture patches onto a target surface. For example, a conventional "lapped texture" technique randomly pastes texture patches onto a surface following orientation hints provided by a user. To hide mismatched features across patch boundaries, textures in the overlapping regions are blended. This technique works well for many textures, but for highly structured textures and textures with strong low-frequency components, the seams along patch boundaries are still evident.

A number of other conventional schemes have been proposed for directly synthesizing textures on arbitrary surfaces. For example, a multi-resolution synthesis algorithm has been adapted for directly synthesizing textures on arbitrary surfaces. However, schemes based on directly synthesizing textures on arbitrary surfaces tend to be slow. Such schemes typically produce high-quality results, and can be accelerated by using either tree-structured vector quantization or a "kd-tree" search for identifying candidate texture patches. However, such schemes typically perform poorly when using textures such as so-called "natural" textures. One scheme has been specially adapted to handle "natural" surface textures, however, this scheme does not generalize well to other types of textures.

Another problem with mapping textures to arbitrary surfaces is a lack of visual realism. Visual realism in digital images requires detailed attention to both surface geometry and surface details. With recent advances in surface texture synthesis, a real-world surface, such as a real surface that is digitally reconstructed from laser range scans, can be decorated with a texture that fits the surface naturally and seamlessly. However, conventional texturing of real world surfaces tends to lack realism because textures in traditional graphics represent only color or albedo variations on smooth surfaces. Real-world textures, on the other hand, arise from both spatially-variant surface reflectance and surface mesostructures, i.e., the small but visible local geometric details. Unfortunately, the mesostructures which are responsible for fine-scale shadows, occlusions, and specularities, are typically ignored by conventional textures mapping schemes.

Consequently, in an attempt to address this problem, one conventional scheme captures and renders the complex appearance of real world surfaces, by using polynomial texture maps (PTM's) for capturing the surface appearance under a fixed viewpoint but different lighting directions. For surface light fields, the appearance of surfaces under fixed light sources but different viewing directions are captured and stored in a compact way for rendering. In particular, PTM's are an extension to conventional texture maps that allow enhanced image quality. This enhanced image quality is accomplished by storing second-order bi-quadratic polynomial coefficients for each image pixel in addition to storing a color for each pixel. Consequently, these PTM's are capable of modeling changes to a pixel color based on either light source position or viewing direction.

Another approach for realistic texturing of surfaces uses a "bidirectional texture function" (BTF) to represent real-world textures for modeling surface mesostructures and reflectance variations. The BTF is a six-dimensional function whose variables include the two-dimensional pixel position, and the viewing and lighting directions. A BTF can be mapped onto surfaces using conventional texture mapping techniques such as those discussed above. However, BTF mapping on arbitrary surfaces can introduce inconsistent mesostructures. In particular, conventional schemes for texture mapping arbitrary surfaces typically use a collection of overlapping patches, with textures in the overlapping regions being blended to hide seams.

While this technique works well for many textures, for BTF's, blending often introduces inconsistent mesostructures, thereby reducing the realism of the texture mapped surface. Further, BTF mapping on arbitrary surfaces also suffers from other common problems of texture mapping, such as, for example, distortion, seams, and the need for considerable user intervention to create good-quality texture maps. Thus, the requirement of a consistent mesostructure for ensuring image realism is where surface BTF synthesis differs fundamentally from surface texture synthesis since conventional textures ignore mesostructures completely.

One conventional scheme considers mesostructures in synthesizing a continuous BTF for synthesizing images under different viewing and lighting settings. Unfortunately, this scheme is unable to efficiently accomplish surface BTF synthesis because it is too time consuming to reconstruct or render the appearance from the surface geometry for all lighting and viewing settings, especially for BTFs with complex geometry or radiance distributions. Further, this scheme has difficulty in handling real-world textures with complex bump structures or without dominant diffuse components.

Attempts to achieve a consistent mesostructure on a surface have been made by directly applying surface texture synthesis techniques to surface BTF synthesis. With such schemes, a sample BTF is regarded as a two-dimensional texture map, in which the BTF value at each pixel is a four-dimensional function of the viewing and lighting directions, with the four-dimensional function being discretized into a vector for texture synthesis. Unfortunately, this approach incurs a huge computational cost because of the large amount of data in a BTF sample. For example, at a resolution of 12×15×12×5, the BTF value at a pixel is a 10800-dimensional vector, as opposed to the usual three-dimensional RGB vectors for color pixels. Since texture synthesis time grows in direct proportion to the vector dimension, computing a surface BTF with such schemes can take days or even months. Principal Components Analysis (PCA) has been used to reduce the vector dimension; however, PCA has been unable to reduce the vector dimension significantly enough to alter the nature of the problem.

Another BTF-based texture synthesis scheme introduced three-dimensional "textons" based on an observation that, at a local scale, there are only a small number of perceptually distinguishable mesostructures and reflectance variations on a surface. Unfortunately, three-dimensional textons themselves are not compact because of their huge appearance vectors. Consequently, reconstructive BTF synthesis based on this scheme is not feasible on most surfaces because the basic operations for surface BTF synthesis, such as, for example, texton resampling, distance computation, and BTF reconstruction, are prohibitively computationally expensive with very large storage data requirements. For example, with this scheme, a surface BTF reconstruction requires that a four-dimensional function be assigned to each mesh vertex. Consequently, a surface mesh of only 250 K vertices will require approximately 2.5 Gbytes of storage.

Many conventional BTF synthesis schemes are designed for two-dimensional rectangles or rectangular surface patches, not for arbitrary surfaces. For example, "texture morphing" is a conventional technique for BTF synthesis which assumes that a surface is a simple height field with a Lambertian reflectance. Another such scheme provides a BTF synthesis algorithm which is based on three-dimensional textons. This algorithm first synthesizes a two-dimensional map of texton labels using non-parametric sampling, and then reconstructs a BTF from the synthesized texton labels. However, one problem with this reconstructive synthesis of a BTF is the high computational costs for synthesizing texton labels and reconstructing the BTF using the huge appearance vectors of textons (e.g., an appearance vector is 57,600-dimensional if only 400 sample images of the BTF are used).

Therefore, what is needed is a system and method for efficiently synthesizing surface BTF-type textures which provide realistic texturing of arbitrary surfaces. Further, such a system and method should provide for compact data structures that minimize texture synthesis data storage requirements. Finally, such a system and method should rapidly synthesize realistic textures on arbitrary surfaces.

SUMMARY

A bidirectional texture function (BTF) is a six-dimensional function that describes textures arising from both spatially-variant surface reflectance and surface mesostructures. A "BTF synthesizer" as described herein uses a BTF sample comprised of a set of images to efficiently and rapidly synthesize surface BTF-type textures over arbitrary surfaces represented by a triangular mesh. Further, such texture synthesis is accomplished using relatively small data structures so as to minimize texture synthesis data storage requirements. Note that the sample BTF's used by the BTF synthesizer are derived from any of a number of sources, including for example, those measured from real-world textures, or from synthetic BTF samples.

The BTF synthesizer described herein synthesizes BTF's on an arbitrary surface given a sample BTF comprised of a set of images. Further, the BTF synthesizer maintains a consistent mesostructure on the surface while synthesizing such BTF's. This BTF synthesis is based on the use of "surface textons" which are comprised of essential information extracted from the sample BTF in order to facilitate the synthesis. Any BTF synthesized using the BTF synthesizer described herein not only looks similar to the BTF sample in all viewing and lighting conditions, but also exhibits a consistent mesostructure when those viewing and lighting directions change. Further, the synthesized BTF fits the target surface naturally and seamlessly.

In general, the aforementioned surface textons are derived from three-dimensional textons. However, unlike conventional three-dimensional textons, surface textons have no appearance vectors. Consequently, surface textons constitute a compact data structure for extracting essential information from the BTF sample to facilitate surface BTF synthesis. These surface textons are used for synthesizing a "surface texton map," which is a texton-based compact representation of the synthesized surface BTF. This compact representation, i.e. the surface texton map, is then directly used for rendering on the surface, without the necessity of performing a conventional BTF reconstruction.

A "sample BTF" is regarded as a texture map in which every pixel includes the value of a four-dimensional function representing viewing and lighting directions. Given this sample BTF texture map, and a mesh representing an arbitrary surface, the surface BTF is synthesized in two steps: 1) texton analysis; and 2) surface BTF synthesis.

In general, in the texton analysis step, a two-dimensional "texton map" is generated, and used in the construction of a "surface texton space" which is represented by a matrix of the dot-products of pairs of three-dimensional textons. This matrix is referred to throughout this description as the "dot-product matrix."

In constructing the two-dimensional "texton map," a three-dimensional "texton vocabulary" consisting of prototype surface texture patches is first constructed from the sample BTF. Based on this texton vocabulary, a representative "texton label" is simply assigned to each pixel of the sample BTF to generate the two-dimensional texton map.

The aforementioned surface texton space is the inner-product space spanned by using the three-dimensional textons as basis vectors. Each element of the surface texton space is called a "surface texton." The surface texton space is represented by a dot-product matrix that stores the dot-product of every pair of three-dimensional textons in the surface texton space. Further, because there are only a small number of three-dimensional textons, the dot-product matrix is compact, and thus, so is the surface texton space. For example, a 64×64 BTF sample consisting of 3600 color images is approximately 59 Mb in size. Its representation with 400 three-dimensional textons extracted from 400 sample images is about 92 Mb, while the corresponding dot-product matrix is only 640 Kb, which is less than 1 percent of the size of the sample BTF. The construction of the surface texton space is accomplished by simply calculating the dot-product matrix and discarding the appearance vectors.

In the surface BTF synthesis step, a surface texton map is used to compactly represent the surface BTF. This surface texton map is a list of entries, one for each mesh vertex of the surface for which the BTF is being synthesized. The entry for each vertex consists of a texton label and texture coordinates. The two-dimensional texton map is treated as a texture sample (i.e., as a "sample texton map"), and surface texture synthesis is performed to generate the surface texton map. Surface texton map entries for mesh vertices are generated incrementally, one vertex at a time. At each mesh vertex, synthesis of the texton label and generation of texture coordinates defining the BTF value at the mesh vertex are computed simultaneously.

The basic operations in surface texton map synthesis are texton resampling and the distance computation between surface textons. All these calculations can be carried out as operations in the surface texton space and thus are fully determined by the pre-computed dot-product matrix.

However, while the aforementioned processes serve to efficiently produce realistic BTF surface textures, to find the best match for texture synthesis, a complete search of all pixels in the sample texton map is needed. However, this complete search procedure is relatively slow. Unfortunately, while any of a number of conventional acceleration methods used for two-dimensional texture synthesis, such as, for example, the well known k-d tree and Tree Structured Vector Quantization (TSVQ), can be used to improve the performance of the BTF synthesizer, such conventional techniques are still too slow. Consequently, in one embodiment, a search method termed a "k-coherence" search is used for dramatically speeding up the BTF synthesis described herein.

The basic idea of the k-coherence search is that only "good" candidate pixels are searched in the sample texton map, thereby dramatically limiting the potential search space while providing a corresponding increase in overall system performance. "Good" candidate pixels are defined as those pixels where the distance between the candidate's neighborhood and vertex's neighborhood is sufficiently small. Once the best matched pixel in the sample texton map is determined by finding the minimum distance, the texton label and texture coordinates for that pixel are copied to the pixel at the current mesh vertex. This surface texton map may then be used to used to render the BTF to the mesh surface given desired viewing and lighting directions.

In addition to the just described benefits, other advantages of the BTF synthesizer will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee. The specific features, aspects, and advantages of the BTF synthesizer will become better understood with regard to the following description, appended claims, and accompanying drawings where:

DETAILED DESCRIPTION OF THE PREFERRED EMBODIMENTS

In the following description of the preferred embodiments of the BTF synthesizer, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
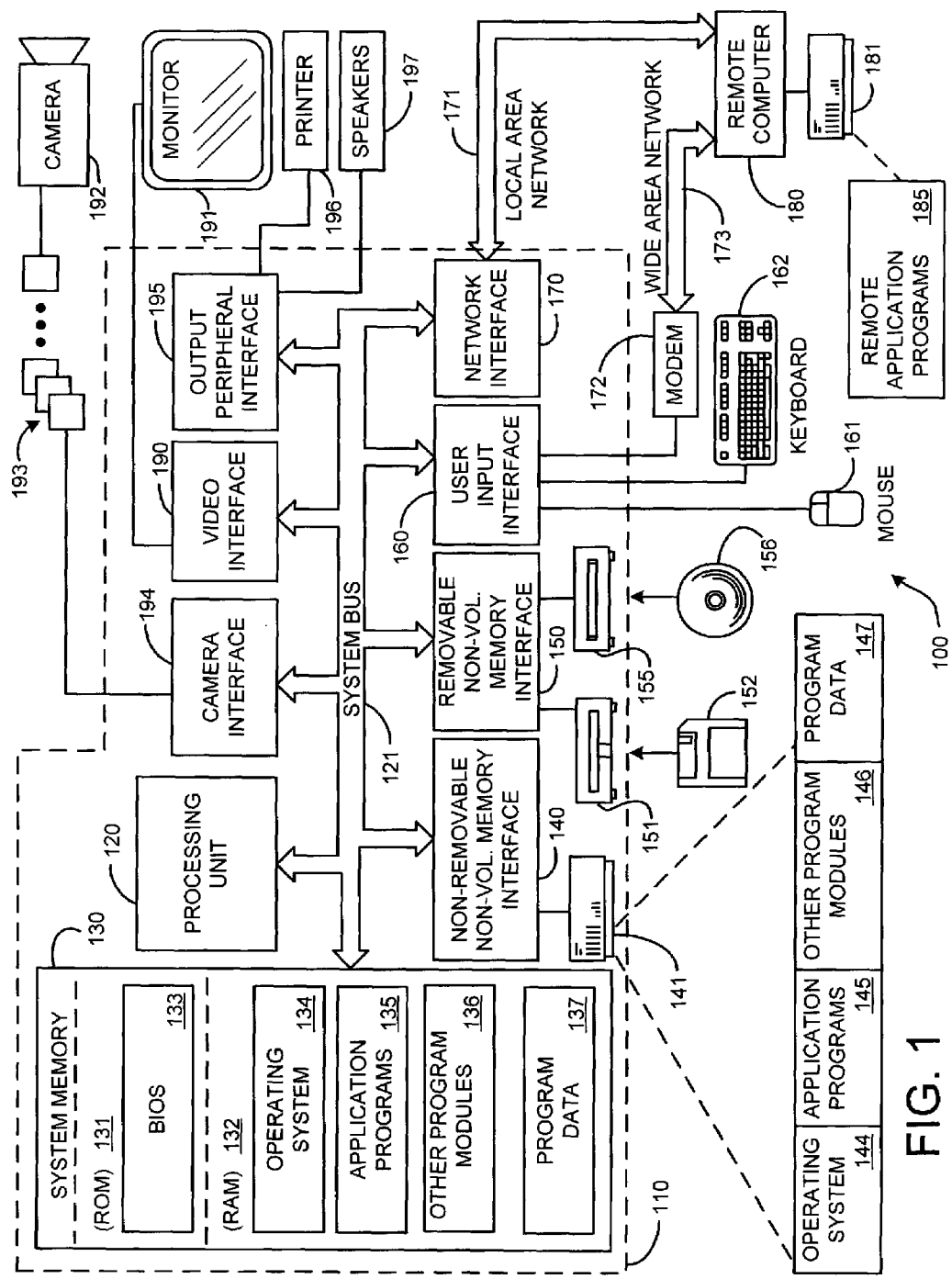
FIG. 1 is a general system diagram depicting a general-purpose computing device constituting an exemplary system for synthesizing BTF's on an arbitrary surface given a sample BTF.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for using a BTF sample to efficiently and rapidly synthesize surface BTF-type textures over arbitrary surfaces.

2.0 Introduction:

A bidirectional texture function (BTF) is a six-dimensional function that describes textures arising from both spatially-variant surface reflectance and surface mesostructures. A "BTF synthesizer" as described herein uses BTF samples comprised of a set of natural or synthetic images to efficiently and rapidly synthesize surface BTF-type textures over arbitrary three-dimensional surfaces represented by a triangular mesh. Further, such texture synthesis is accomplished using relatively small data structures so as to minimize texture synthesis data storage requirements. Note that the sample BTF's used by the BTF synthesizer are derived from any of a number of sources, including for example, those measured from real-world or synthetic textures.

The BTF synthesizer described herein synthesizes BTF's on an arbitrary surface given a sample BTF as an input. Further, the BTF synthesizer maintains a consistent mesostructure on the surface while synthesizing such BTF's. This BTF synthesis is based on the use of "surface textons" which are comprised of essential information extracted from the sample BTF in order to facilitate the synthesis. Any BTF synthesized using the BTF synthesizer described herein not only looks similar to the BTF sample in all viewing and lighting conditions, but also exhibits a consistent mesostructure when those viewing and lighting directions change. Further, the synthesized BTF fits the target surface naturally and seamlessly.

2.1 System Overview:

In general, the aforementioned surface textons are derived from three-dimentional textons. As is known to those skilled in the art, three-dimensional textons consist of very small prototype surface texture patches with associated local geometric and photometric properties. Examples of such three-dimensional textons include ridges, grooves, bumps, hollows, reflectance boundaries, spots, stripes, etc., or any combinations thereof. Associated with each three-dimentional texton is an appearance vector which characterizes the local irradiance distribution, represented as a set of linear Gaussian derivative filter outputs, under different lighting and viewing conditions.

However, unlike conventional three-dimensional textons, the surface textons described herein have no appearance vectors. Consequently, unlike conventional three-dimensional textons, surface textons constitute a compact data structure for extracting essential information from the BTF sample to facilitate surface BTF synthesis. These surface textons are used for synthesizing a "surface texton map," which is a texton-based compact representation of the synthesized surface BTF. This compact representation, i.e. the surface texton map, is then directly used for rendering on the surface, without the necessity of performing a conventional BTF reconstruction.

A "sample BTF" is regarded as a texture map in which every pixel includes the value of a four-dimensional function representing viewing and lighting directions. Given this sample BTF texture map, and a mesh representing an arbitrary surface, the surface BTF is synthesized in two steps: 1) texton analysis; and 2) surface BTF synthesis.

In the texton analysis step, a two-dimensional "texton map" (also referred to as a "sample texton map") is first generated. In generating the sample texton map, a three-dimensional "texton vocabulary" consisting of prototype surface texture patches is first constructed from the sample BTF. Based on this texton vocabulary, a "texton label" is assigned to each pixel of the sample BTF to generate the two-dimensional texton map. This two dimensional and used in constructing a surface texton space which is represented by a matrix of the dot-products of three-dimensional texton pairs, as described below in detail in Section 3.2.

In general, the aforementioned surface texton space is the inner-product space spanned by using the three-dimensional textons as basis vectors. Each element of the surface texton space is called a "surface texton." The surface texton space is represented by a dot-product matrix that stores the dot-product of every pair of three-dimensional textons in the surface texton space. Further, because there are only a small number of three-dimensional textons, the dot-product matrix is compact, and thus, so is the surface texton space.

For example, a 64×64 BTF sample consisting of 3600 color images is approximately 59 Mb in size. Its representation with 400 three-dimensional textons extracted from 400 sample images is about 92 Mb, while the corresponding dot-product matrix is only 640 Kb, which is less than 1 percent of the size of the sample BTF. The construction of the surface texton space is accomplished by simply calculating the dot-product matrix and discarding the appearance vectors.

In the surface BTF synthesis step, a surface texton map is used to compactly represent the surface BTF. This surface texton map is a list of entries, one for each mesh vertex of the surface for which the BTF is being synthesized. The entry for each vertex consists of a texton label and texture coordinates. The two-dimensional texton map is treated as a texture sample (i.e., as a "sample texton map"), and surface texture synthesis is performed to generate the surface texton map. Surface texton map entries for mesh vertices are generated incrementally, one vertex at a time. At each mesh vertex, synthesis of the texton label and generation of texture coordinates defining the BTF value at the mesh vertex are computed simultaneously.

The basic operations in surface texton map synthesis are texton resampling and the distance computation between surface textons. All these calculations can be carried out as operations in the surface texton space and thus are fully determined by the pre-computed dot-product matrix.

However, while the aforementioned processes serve to efficiently produce realistic BTF surface textures, to find the best match for texture synthesis, a complete search of all pixels in the sample texton map is needed. However, this complete search procedure is relatively slow. Unfortunately, while any of a number of conventional acceleration methods used for two-dimensional texture synthesis, such as, for example, the well known k-d tree and Tree Structured Vector Quantization (TSVQ), can be used to improve the performance of the BTF synthesizer, such conventional techniques are still too slow.

Consequently, in one embodiment, a search method termed a "k-coherence" search is used for dramatically speeding up the BTF synthesis described herein. The basic idea of k-coherence search is that only "good" candidate pixels are searched in the sample texton map, thereby dramatically limiting the potential search space while providing a corresponding increase in overall system performance. "Good" candidate pixels are defined as those pixels where the distance between the candidate's neighborhood and vertex's neighborhood is sufficiently small.

Figure 2:
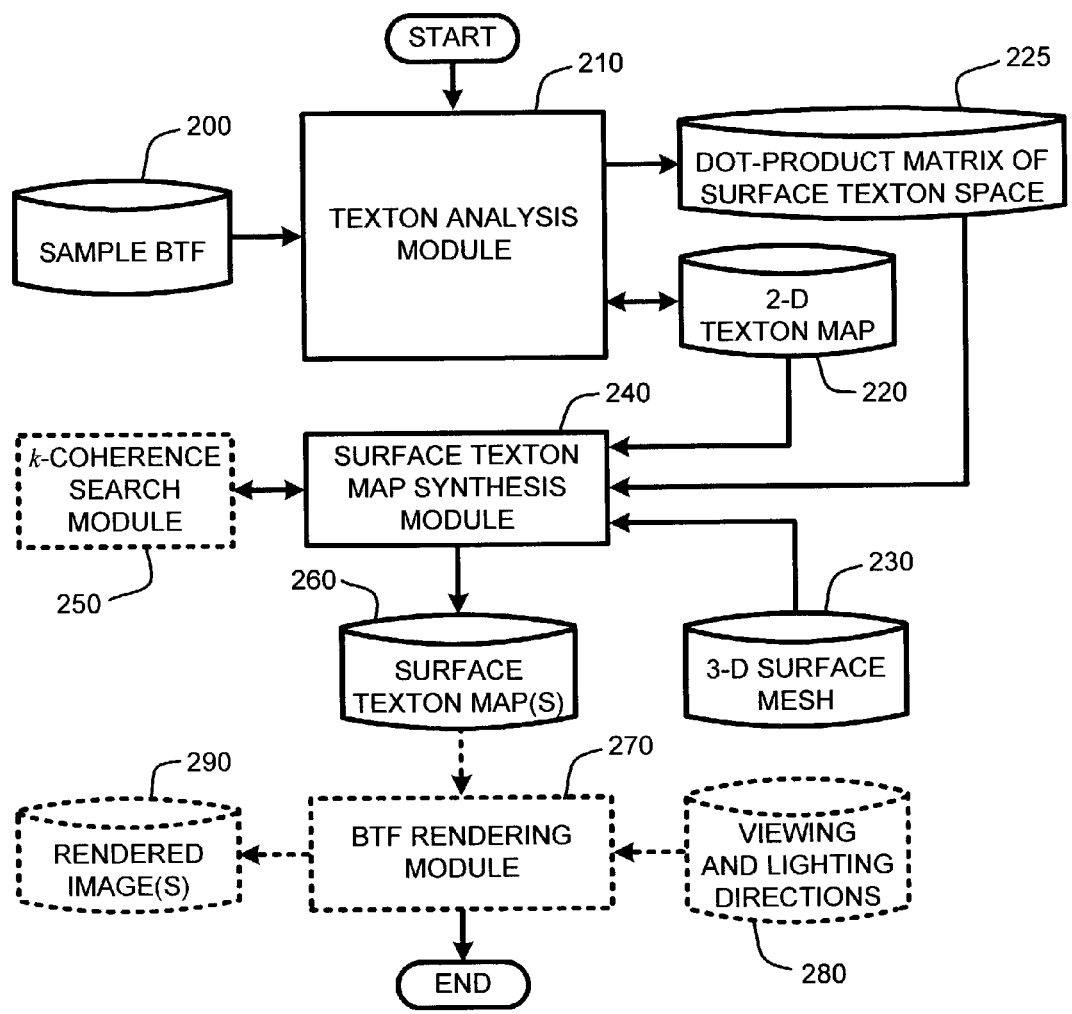
FIG. 2 illustrates an exemplary architectural diagram showing exemplary program modules for synthesizing BTF's on an arbitrary surface given a sample BTF.

2.2 System Architecture:

The general system diagram of FIG. 2 illustrates the processes generally described above. In particular, the system diagram of FIG. 2 illustrates interrelationships between program modules for implementing a "BTF synthesizer" for synthesizing a BTF on an arbitrary surface given a sample BTF as an input. It should be noted that the boxes and interconnections between boxes that are represented by broken or dashed lines in FIG. 2 represent alternate embodiments of the BTF synthesizer, and that any or all of these alternate embodiments, as described below, may be used in combination with other alternate embodiments that are described throughout this document.

In general, as illustrated by FIG. 2, a system and method for synthesizing a BTF on an arbitrary surface begins by providing a sample BTF 200 to a texton analysis module 210. The texton analysis module 210 then analyzes the sample BTF 200 to produce a two-dimensional texton map 220, which is in turn used in constructing a surface texton space that is represented by a dot-product matrix 225.

The two-dimensional texton map 220 is automatically constructed from a three-dimensional "texton vocabulary" consisting of prototype surface texture patches derived from the sample BTF 200 by assigning a "texton label" to each pixel of the sample BTF. The surface texton space is represented by a dot-product matrix 225 that stores the dot-product of every pair of three-dimensional textons in the surface texton space which represents the inner-product space spanned by using the three-dimensional textons as basis vectors.

Once the two-dimensional texton map 220 and the dot-product matrix 225 have been constructed from the sample BTF 200, they are provided to a surface texton map synthesis module 240 along with a three-dimensional surface mesh 230 that represents any arbitrary three-dimensional surface comprised of triangular elements.

Next, the surface texton map synthesis module 240 synthesizes a surface texton map 260 is comprised of a list of entries, one for each vertex of the three-dimentional mesh 230. The entry for each vertex of the surface texton map 260 consists of a texton label and texture coordinates. Synthesis of the surface texton map 260 is accomplished by treating the two-dimensional texton map 220 as a texture sample, then performing a surface texture synthesis to generate the surface texton map. Specifically, surface texton map 260 entries for mesh vertices are generated incrementally, one vertex at a time.

At each mesh 230 vertex, synthesis of the texton label and generation of texture coordinates defining the BTF value at the mesh vertex are computed simultaneously via a texton resampling operation and followed a distance computation between surface textons for identifying a pixel in the sample texton map 220 having a minimum distance to a pixel in the sample BTF 200. As noted above, these calculations are carried out as operations in the surface texton space and thus are fully determined by the pre-computed dot-product matrix 225. Once the best matched pixel in the sample texton map is determined by finding the minimum distance, the texton label and texture coordinates for that pixel are copied to the pixel at the current mesh vertex.

Further, in one embodiment, a k-coherence search module 250 is used to dramatically improve the synthesis speed of the surface texton map 260. In particular, the k-coherence search module 250 k-coherence limits the search of the sample texton map 220 to a search of "good" candidate pixels in the sample texton map, thereby dramatically limiting the potential search space while providing a corresponding increase in overall system performance. "Good" candidate pixels are defined as those pixels where the distance between the candidate's neighborhood and vertex's neighborhood is sufficiently small. Further, in one embodiment, a distance threshold between candidates is adjustable, so as to either increase or decrease the number of good candidate pixels that are subject to search.

Finally, in one embodiment, once the surface texton map 260 has been synthesized, it is provided to a BTF rendering module, along with desired lighting and viewing directions 280, and the BTF is rendered to the surface of the three-dimentional mesh 230. The rendered image 290 is then either stored or provided to a display device, as desired.

Rendering of the surface BTF by the BTF rendering module 270 is accomplished on the three-dimensional mesh 230 by computing the viewing and lighting directions for each mesh vertex in its local texture coordinates frame from the given light source location and the viewpoint 280. Vertices occluded from either the light sources or the viewpoint are simply ignored. Next, a set of nearby images are found from the sample BTF 200. Using the texture coordinates of the current vertex, the colors from corresponding pixels in this set of nearby images are simply looked up and blended to get the color for the current vertex. With all vertex colors obtained, the mesh is then rendered for storage or display, as desired. This procedure is then repeated for every novel lighting/viewing configuration 280.

3.0 Operation Overview:

As noted above, the BTF synthesizer generally operates by using a BTF sample to efficiently and rapidly synthesize surface BTF-type textures over arbitrary surfaces in a two step process consisting of a texton analysis step, and a surface BTF synthesis step. Specific details regarding implementation of the BTF synthesizer are provided in the following sections.

3.1 BTF Synthesis Overview:

The aforementioned sample BTF $T(x,y,\theta_i,\phi_i,\theta_r,\phi_r)$ is regarded as a texture map in which every pixel (x,y) has the value of a four-dimeinsonal function $T_{(x,y)}(\theta_i,\phi_i,\theta_r,\phi_r)$ representing viewing and lighting directions, $\theta$ and $\phi$, respectively. Given T and a mesh M representing an arbitrary surface, a surface BTF T' is synthesized in two steps: texton analysis and surface BTF synthesis.

In the first step, a two-dimensional texton map $t_{in}$ is generated for building a surface texton space S, which is represented by the dot-product matrix $\Gamma$. In particular, given the sample BTF T, a three-dimensional texton vocabulary $V=\{t_1, \ldots, t_{n_t}\}$ of prototype surface texture patches is constructed. Note that construction of such three-dimensional texton vocabularies is discussed below in greater detail in Section 3.2.1. Based on the texton vocabulary V a texton label is assigned to each pixel of the sample BTF T for generating the aforementioned two-dimensional texton map $t_{in}$.

The surface texton space S is the inner-product space spanned by using the three-dimensional textons $\{t_1, \ldots, t_{n_t}\}$ as basis vectors. Each element of S is called a surface texton. The surface texton space S is represented by the dot-product matrix $\Gamma$, which is an $n_t \times n_t$ matrix that stores the dot-product of every pair of three-dimensional textons in V. The construction of S is simple; in fact, the construction of S is accomplished by simply calculating the dot-product matrix $\Gamma$ and discarding the appearance vectors.

Next, in the aforementioned surface BTF synthesis step, a surface texton map is used to compactly represent the surface BTF T' by synthesizing a surface texton map $t_{out}$ that is comprised of a list of entries, one for each mesh vertex. The entry for vertex v, $t_{out}(v)$, consists of a texton label and texture coordinates $p_v=(a_v,b_v)$, implicitly defining:

$$T_v'(\theta_i,\phi_i,\theta_r,\phi_r)=T(a_v,b_v,\theta_i,\phi_i,\theta_r,\phi_r) \quad \text{Equation 1}$$

In particular, the two-dimensional texton map $t_{in}$ is treated as a texture sample that is used to perform surface texture synthesis to generate the surface texton map $t_{out}$. The surface texton map entries for $t_{out}$ are generated for mesh vertices incrementally, one vertex at a time. At each mesh vertex v, synthesis of the texton label and generation of texture coordinates defining the BTF value at the mesh vertex are computed simultaneously. The basic operations in surface texton map synthesis are texton resampling and the distance computation between surface textons. All these calculations are carried out as operations in the surface texton space S and thus are fully determined by the pre-computed dot-product matrix $\Gamma$ as discussed in further detail below.

3.2 Texton Analysis:

In view of the preceding discussion, it should be appreciated that aforementioned texton analysis is a three step process, including: 1) Build a vocabulary of three-dimensional textons from the sample BTF T; 2) Assign texton labels to the pixels of T to get the two-dimensional texton map $t_{in}$; and 3) Construct the surface texton space S by calculating the dot-product matrix $\Gamma$ and discarding the appearance vectors. These steps are described in detail in the following paragraphs.

3.2.1 Three-dimensional Texton Vocabulary:

The construction of a three-dimensional texton vocabulary begins by using conventional techniques to construct three-dimensional textons from a BTF using K-means clustering. In particular, in order to capture the appearance of mesostructures at different viewing and lighting conditions, the BTF sample $T_{in}$ is treated as a stack of n images, with each image being filtered by a filter bank. In a tested embodiment, the filter bank consisted of $n_b=48$ Gaussian derivative filters. For each pixel of $T_{in}$, the filter responses of $n_s$ selected images are concatenated into a $n_s n_b$-dimensional data vector. These data vectors are then clustered using the K-means algorithm. The resulting K-means centers $\{t_1, \ldots, t_{n_t}\}$ are the three-dimensional textons of the texton vocabulary, and the associated $n_s n_b$-dimensional concatenated filter response vectors $\{v_1, \ldots, v_{n_t}\}$ are the appearance vectors.

In addition, an extra texton is generated by averaging the appearance vectors of all textons. This extra texton is used as the default texton in surface BTF synthesis. Note that in a tested embodiment of the BTF synthesizer, a value of $n_t=400$ was used for the dot-product matrix $\Gamma$, which, as noted above, is an $n_t \times n_t$ matrix.

However, in contrast to conventional three-dimensional texton construction schemes which randomly choose $n_s$ images for constructing the three-dimensional texton vocabulary, the three-dimensional texton construction employed by the BTF synthesizer described herein chooses $n_s$ selected images via K-means clustering.

In particular, the reason for only selecting $n_s$ images from $T_{in}$ for clustering, where $n_s \ll n$, is to reduce computation by exploring the coherence of the same material in different viewing and lighting settings. However, the random sampling of these images by conventional three-dimensional texton construction schemes is sub-optimal because the radiance distribution is non-uniform in the viewing-lighting space. Consequently, the BTF synthesizer described herein chooses representative images by K-means clustering in the viewing-lighting dimensions of the BTF sample $T_{in}$.

For example, in a tested embodiment of the BTF synthesizer, image $I_\lambda$ of $T_{in}$ is filtered using the filter bank of 48 Gaussian derivative filters, producing a 48-dimensional filter-response vector for each pixel of $I_\lambda$. The filter-response vectors of pixels on a regularly spaced sub-sampling grid in $I_\lambda$ are then concatenated into an image appearance vector representing $I_\lambda$. The image appearance vectors of all images in $T_{in}$ are then K-means clustered. For each cluster, the image whose image appearance vector is nearest to the cluster center is then selected as the representative image. Note that forming an image appearance vector by concatenating only filter-response vectors on a sub-sampling grid serves to reduce computational overhead. Further, sub-sampling is appropriate because, as far as clustering is concerned, the filter-response vector of a pixel captures enough local structure around the pixel.

3.2.2 Two-Dimensional Texton Map:

Once the texton vocabulary $\{t_1, \ldots, t_{n_t}\}$ has been determined as described above, a texton label is assigned to each pixel of $T_{in}$. The texton label at pixel p is given by $$t_{in}(p) = \arg\min_{j=1}^{n_t} \|v(p) - v_j\|^2,$$

where $v(p)$ is the $n_s n_b$-dimensional concatenated filter response vector of pixel p, and $v_j$ is the appearance vector of three-dimensional texton $t_j$. The resulting $t_{in}$ is called a "two-dimensional texton map," a "sample texton map," or simply a "texton map" for short.

3.2.3 Surface Textons:

The three-dimensional textons $\{t_1, \ldots, t_{n_t}\}$ representing the texton vocabulary can be regarded as abstract vectors that span the vector space S. Any vector s in S is of the form $$s = \sum_{i=1}^{n_t} a_i t_i,$$

where $a_1, \ldots, a_{n_t}$ are real numbers. As noted above, S represents the "surface texton space." The surface texton space is actually an inner-product space, where the dot product of two basis vectors $t_i$ and $t_j$ is defined as $t_i \cdot t_j = v_i \cdot v_j$, where $v_i$ and $v_j$ are the appearance vectors of $t_i$ and $t_j$, respectively. The dot product of every pair of basis vectors is pre-computed and the results stored in an $n_t \times n_t$ matrix $\Gamma=(\gamma_{ij})$ such that $\gamma_{ij}=t_i \cdot t_j$. Once $\Gamma$ is computed, all appearance vectors are simply discarded.

As noted above, each element s of the surface texton space S is a surface texton. Further, it should be noted that $\{t_1, \ldots, t_{n_t}\}$, with their appearance vectors discarded as described above, are also surface textons because they are the basis of S. Consequently, any resampling and distance computations for surface textons as required by surface BTF synthesis can be formulated as linear transformations and dot-product operations in the surface texton space S. All these operations are abstract in that they do not refer to the appearance vectors. In particular, the dot product of any two vectors s and s' in S can be obtained easily from $\Gamma$, without referring to any appearance vector. In particular, where $$s = \sum_{i=1}^{n_T} a_i t_i \text{ and } s' = \sum_{i=1}^{n_T} a'_i t_i,$$

it is easy to verify that $$s \cdot s' = \sum_{i,j=1}^{n_T} a_i a'_j t_i \gamma_{ij}.$$

3.3 Surface BTF Synthesis:

In general, synthesis of the surface texton map is accomplished given the surface mesh and sample texton map by using a hierarchical synthesis approach wherein the synthesis is an iterative process that proceeds from a course resolution level to a fine resolution level. In a tested embodiment, each subsequently finer level was a power of two higher resolutions than the preceding level, so as to allow for sub-sampling without aliasing. At each resolution level, the BTF is synthesized onto the surface, vertex by vertex. However, for purposes of explanation, the case of a single resolution synthesis step is first described below, with a discussion of multi-resolution synthesis being provided in Section 3.3.5.

In particular, considering the single resolution case, the problem is to determine the synthesis result for each mesh vertex. This is a four step process as described below.

The first step of this process is to flatten the triangles around the current vertex onto the local texture plane. Next, a resampling step is applied to obtain mesh vertex neighborhood at regular sampling girds. Specifically, in the resampling step, to obtain the value for each sampling point $p_i$, the triangle that $p_i$ is in is first determined. Ideally, the value on $p_i$ would be obtained by directly interpolating the values of the three triangle vertices to determine the value of $p_i$. However, in BTF synthesis, the texton labels are stored on the mesh vertices, and these texton labels cannot be interpolated directly. Consequently, the weights and the three texton labels for each neighbor of $p_i$ are simply stored in this step.

Next, in the third step, all of the pixels in the sample texton map are searched to find a pixel whose neighborhood is best matched to the current mesh vertex's neighborhood. This best match is determined by computing and minimizing the "distance" between pixel neighborhoods. In particular, the distance between two neighborhoods is the sum of square difference. It turns out that the distance is a linear combination of dot-products of original three-dimentional textons. Further, because these dot-products can be found from the pre-computed matrix, the distance can be computed very quickly. Note that if two or more pixel neighborhoods have the same minimum distance, then one of the pixel neighborhoods having the minimum distance is chosen at random.

Once the best matched pixel p for pixel $p_i$ in the sample texton map is determined by finding the minimum distance, the texton label and texture coordinates for pixel p are copied to the mesh vertex for pixel $p_i$. Consequently, after synthesis, the resulting surface texton map includes texton labels and corresponding texture coordinates for each mesh vertex. Thus, at the rendering stage, given lighting and viewing directions, the lighting and viewing parameters for each vertex are easily computed. Combined with the texture coordinates on this vertex, the resulting six parameters (i.e., the position, lighting, and viewing directions) are used to look up the original BTF samples. Interpolating the nearby sample values then provides the color for each vertex.

Synthesis of the surface texton map, as summarized above, is discussed in greater detail in the following paragraphs.

3.3.1 BTF Synthesis with Surface Textons:

As noted above, before BTF synthesis starts for the arbitrary surface represented by the target mesh M, the two-dimensional texton map $t_{in}$, the surface texton space S, and the dot-product matrix Γ are determined based on the sample BTF T. Given this information, a local texture coordinates frame ($\vec{s}, \vec{t}, \vec{n}$) is defined at each vertex v of the target mesh M. The vector $\vec{n}$ is the surface normal at v, and $\vec{s}$ and $\vec{t}$ are the "right" and "up" directions, respectively, determined by a vector field which is either interpolated from a number of user-specified directions or generated by a conventional "relaxation" technique.

3.3.2 Surface Texton Map Synthesis:

As noted above, surface texton map synthesis is an iterative multi-resolution process, beginning with a course resolution level, and iteratively moving to a finer resolution level, as desired. However, for purposes of explanation, the following discussion will describe the synthesis of a single-resolution version of the surface texton map synthesis.

In general, for each level of surface texton map synthesis, a surface texton map entry $t_{out}(v)$ is computed for every vertex v of the target mesh M. At each vertex v, the surface texton map entry $t_{out}(v)$ is obtained through by first constructing a neighborhood N(v) in the (s,t)-plane of v's local texture coordinates frame ($\vec{s}, \vec{t}, \vec{n}$) Next, a candidate set C(v) is built. This candidate set C(v) consists of the candidate pixels for v in the two-dimensional texton map $t_{in}$. Next, the entire candidate set C(v) is searched to find a pixel $p_0 = (a_0, b_0)$ such that the distance between N(v) and the neighborhood of $p_0$, $N(p_0)$, is a minimum. Finally, once this minimum is identified, the texton label of the surface texton map entry $t_{out}(v)$ is set to $t_{in}(p_0)$, while the texture coordinates of $t_{out}(v)$ is set to $(a_0, b_0)$.

In other words, the surface texton map synthesis essentially generates the BTF value at vertex v by simply copying the BTF value at location $p_0$ in the sample BTF. Location $p_0$ is chosen according to the neighborhood similarity of N(v) and $N(p_0)$ as measured by their surface textons. This is a valid similarity measure because the texton-based similarity of N(v) and $N(p_0)$ implies their similarity as measured by their BTF values. Further, one advantage of the texton-based neighborhood similarity measure is that texton distances can be efficiently evaluated for surface textons.

3.3.3 Texton Resampling:

As noted above, Texton resampling is necessary for constructing the neighborhood N(v). N(v) is constructed in the (s,t)-plane of v's local texture coordinates frame ($\vec{s}, \vec{t}, \vec{n}$) by first generating a patch P(v) in the (s,t)-plane by selecting a set of triangles from the target mesh M neighboring the vertex v that is currently being synthesized. Next, the pixels in the neighborhood N(v) are resampled from the patch triangles using a conventional neighborhood template.

Finally, a surface texton s(p) is obtained at each neighborhood pixel p in N(v) through the following interpolation:

$$s(p) = w_0 t_{i_0} + w_1 t_{i_1} + w_2 t_{i_2} \qquad \text{Equation 2}$$

where $(w_0, w_1, w_2)$ is the barycentric coordinates of p in the patch triangle that contains p, and $(t_{i_0}, t_{i_1}, t_{i_2})$ are textons at the vertices of that patch triangle. For implementation, s(p) can be efficiently represented by a six-tuple $(w_0, w_1, w_2, t_{i_0}, t_{i_1}, t_{i_2})$. The default texton is assigned to neighborhood pixels that are not contained by any patch triangle.

Figure 3A:
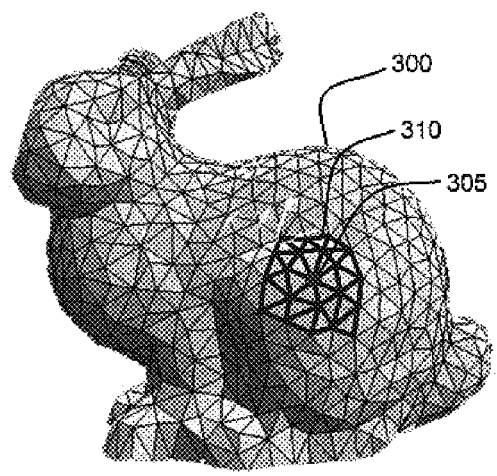
FIG. 3A illustrates an exemplary three-dimensional triangular mesh with a three-dimensional surface patch highlighted around a vertex for use with the BTF synthesizer.
Figure 3B:
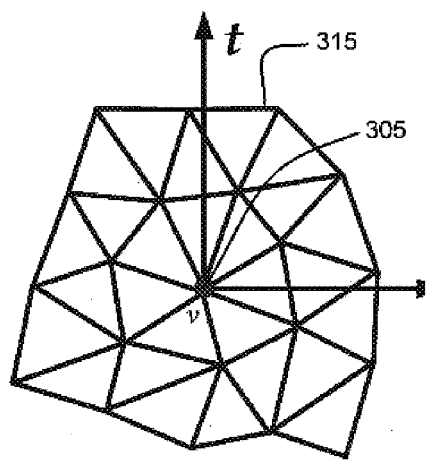
FIG. 3B illustrates the highlighted surface patch of FIG. 3A after the surface patch is "flaftened" into a two-dimensional patch.
Figure 3C:
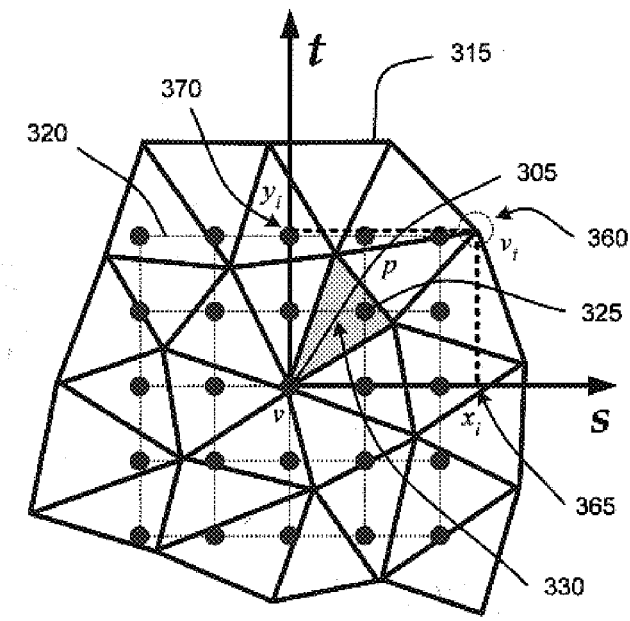
FIG. 3C illustrates a rectangular resampling grid overlaid on the flattened two-dimensional surface patch of FIG. 3B.

An example of this texton resampling process is graphically represented by FIG. 3A through FIG. 3D. In particular, FIG. 3A illustrates a three-dimensional rabbit shaped triangular mesh M 300. Given a particular vertex v 305 as illustrated the red dot in FIG. 3A, the triangles comprising a three-dimensional surface patch 310 around vertex v is selected and "flattened" into a two-dimensional patch P(v) 315 as represented by FIG. 3B. Next, as illustrated by FIG. 3C, a regular sampling grid 320 (shown in red), comprised of sampling points $p_i$, is overlaid on the patch P(v) 315. This sampling grid 320 represents a "neighborhood template" for resampling the patch P(v) 315.

Figure 3D:
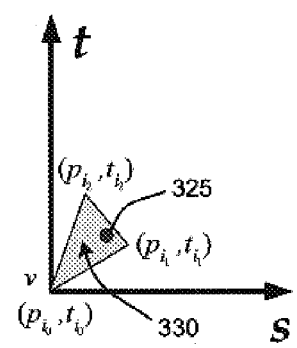
FIG. 3D illustrates identification of a triangle that surrounds a sampling point of the resampling grid, with the three vertices of that triangle being identified as the neighbors of the sampling point.

Next, as illustrated by FIG. 3C and FIG. 3D, a determination is made as to which triangle 330 of the flattened patch P(v) 315 each sampling point p 325 resides in. Finally, as illustrated by FIG. 3D, once this triangle 330 is identified for a given sampling point p 325, the three vertices of that triangle, $(p_{i_0}, t_{i_0})$, $(p_{i_1}, t_{i_1})$ and $(p_{i_2}, t_{i_2})$, respectively, are identified as the neighbors of point p 325. The weights and the texton labels for each of the three neighbors of point p 325 are then stored for use in identifying a pixel from the sample BTF whose neighborhood is best matched to the mesh vertex's neighborhood, as described in further detail below.

3.3.4 Distance Computation:

Next, as noted above, it is necessary to find a pixel $p_0 = (a_0, b_0)$ from the candidate set C(v) such that the distance between the two neighborhoods, N(v) and N($p_0$), is minimized. Thus, for each pixel p in C(v) the distance between the neighborhoods N(v) and N(p) is computed, and the minimum distance identified. This distance can be determined by Equation 3 as follows:

$$\text{distance}(N(v), N(p)) = \sum_{\lambda=1}^{n_v} \|s(p_\lambda - t_{j_\lambda})\|^2 \qquad \text{Equation 3}$$

where n(v) is the number of pixels in N(v) and each $s(p_\lambda)$ is a surface texton. Further, each term $\|s(p_\lambda - t_{j_\lambda})\|^2$ of the above distance can be written as the dot product of two surface textons:

$$(s(p_{80}) - t_{j_\lambda}) \cdot (s(p_\lambda) - t_{j_\lambda}) \qquad \text{Equation 4}$$

which is then easily evaluated using the pre-computed dot-product matrix Γ. Note that if two or more pixel neighborhoods have the same minimum distance, then one of the pixel neighborhoods having the minimum distance is simply chosen at random.

3.3.5 Multi-Resolution Synthesis:

The process for a single stage synthesis is described above. However, to improve synthesis quality, two or more iterations of a multi-resolution version of surface BTF synthesis are performed as described below.

In particular, in a pre-processing stage of the multi-resolution version of surface BTF synthesis, a texton pyramid and a mesh pyramid are constructed. For the texton pyramid, an image pyramid is first constructed for each image of the BTF sample. Next, a two-dimensional texton map and a dot-product matrix are generated at each level of the texton pyramid. The number of textons at the next lower resolution $l_{i+1}$ is about a quarter of that at the current resolution $l_i$.

The mesh pyramid is computed using conventional techniques. In particular, starting from the highest resolution mesh, the mesh is generated in the next lower resolution level $l_{i+1}$ by retiling the current level $l_i$ mesh with about a quarter of the vertices. The vertices at each level of the mesh are randomly mapped to the pixels of the texton map at the same level, with the texton label and texture coordinates of a vertex coming from its corresponding pixel. It should be noted that each higher resolution level is typically a power of two higher resolution than the preceding level, to allow for sub-sampling.

For example, considering a two stage multi-resolution version of surface BTF, in the first pass of the multi-resolution version of surface BTF, the surface texton map at the level $l_i$ mesh is synthesized from the level $l_{i+1}$ texton map. For a mesh vertex $v_i$ at level $l_i$, a point $v_{i+1}$ is identified at the level $l_{i+1}$ mesh by following the surface normal at $v_i$ on the level $l_i$ mesh. The surface texton map entry at $v_{i+1}$ is then computed using the level $l_{i+1}$ texton map. The texture coordinates of $v_i$ is derived from that of $v_{i+1}$. The texton label at $v_i$ is fetched from the level $l_i$ texton map using $v_i$'s texture coordinates.

In the second pass, when synthesizing the surface texton map entry at vertex $v_i$ in the level $l_i$ mesh, the neighborhood of $v_i$ is used along with the neighborhood of $v_{i+1}$ at level $l_{i+1}$, where $v_{i+1}$ is found as in the first pass. For vertex $v_i$, the candidate set $C(v_i)$ is formed using $v_i$'s neighborhood at level $l_i$ only. The two-level neighborhoods and the corresponding dot-product matrices are used for neighborhood distance computation when searching for the best candidate from C(v).

It should be appreciated by those skilled in the art that the multi-resolution version of surface BTF is not limited to the two-level example provided above, and that any number of higher resolution levels may be computed by using the prior levels in the manner described above.

3.4 Fast Search for Surface Textons:

In one embodiment, a simple brute force or full search in which the candidate set C(v) consists of every pixel in the two-dimensional texton map $t_{in}$ for each mesh vertex v. Unfortunately, the full search is slow with surface textons for two reasons. First, the full search is itself slow because the candidate set is as big as it gets. Second, most conventional acceleration techniques including vector quantization and the kd-tree search techniques do not work well with surface textons because surface textons are not the usual intensity values. The kd-tree, for example, requires sorting data vectors by one of their components. Such sorting is not possible when the data vectors are surface textons.

Consequently, there is a need for a process that allows for fast searching of surface textons. One such process for implementing a fast search of surface textons is termed a "k-coherence search." The basic idea of k-coherence search is that we "good" candidate pixels are searched in sample texton map. Here, "good" means that the distance between the candidate's neighborhood and vertex's neighborhood is small. The following discussion illustrates this search using a two-dimensional texture synthesis as an example.

In general, the objective is to synthesize a pixel p given that its neighbors are already synthesized. Starting from each synthesized neighbor pixel, one "good" candidate pixel can be found in the sample texture. This property has been observed in conventional schemes which perform natural texture synthesis. For example, given a particular pixel $p_0$, pixel $p_1$ is identified the sample texture. A "forward shift" from pixel $p_0$ to pixel $p_1$ in sample texture is the same as a corresponding shift in the synthesized texture. The resulting pixels, which are called "1-coherence candidates," can be quickly identified. Further, starting from each 1-coherence candidate, a number of good candidates are identified in sample texture, with the total number of candidates being equal to k. From $p_1$, good candidates whose neighborhoods best match $p_1$'s neighborhood are identified, with the resulting pixels being called "k-coherence candidates."

Specifically, the k-coherence search pre-computes candidates for each pixel in the sample texton map before the search step. As the sample texton map is relatively small, this pre-computing step is fast. During the search step, given the vertex's neighborhood, the 1-coherence pixels are first identified in the sample texton map. Then all candidate 1-coherence pixels are stored together. Only those candidates are then searched to find the best match for the current mesh vertex. The k-coherence search is discussed in greater detail in the following sections.

3.4.1 Forming a Candidate Set for Two-Dimensional Textures:

For purposes of simplifying the explanation, the following discussion describes the k-coherence search in the context of synthesizing a two-dimensional texture $I_{out}$. After introducing the k-coherence search in the two-dimensional texture context, it is further described below in Section 3.4.2 with respect to applying the search to arbitrary three-dimensional surfaces.

Figure 4A:
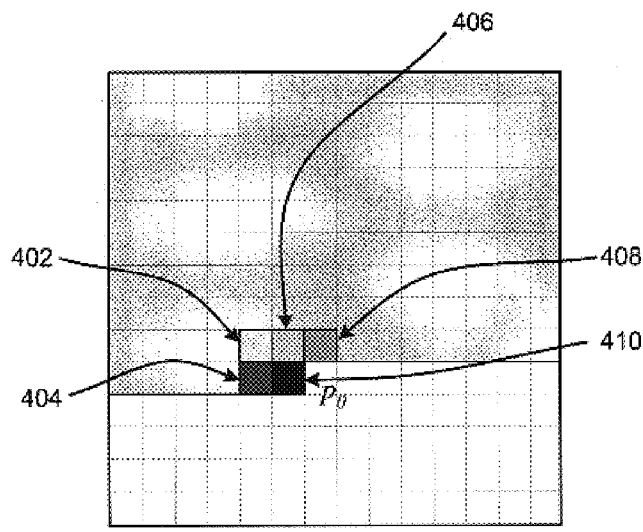
FIGS. 4A through 4C illustrates iterative identification of k-coherence candidates for a pixel in an input texture.

In general, the "k" in the k-coherence search is an adjustable number that represents the number of nearest neighbors to each pixel of an input texture $I_{in}$. For example, the four k-coherence candidates 402, 404, 406, and 408 of a pixel $p_0$ 410 for k=4 are illustrated by FIG. 4A. These four k-coherence candidates 402, 404, 406, and 408, represent the neighborhood $N(p_0)$ for pixel $p_0$ 410 (colored black) in $I_{out}$. Further, as illustrated by FIG. 4B, the pixels of the coherence candidates $C_1(p_0)$ in $I_{in}$ are colored black (412, 414, and 416).

Each black pixel, 412, 414, and 416, is the coherence candidate corresponding to a colored pixel in $N(p_0)$. Specifically, $p_3$ 416 is the coherence candidate corresponding to the green pixel 408, $P_2$ 414 is the coherence candidate corresponding to the red pixel 404, and $p_1$ 412 is the coherence candidate corresponding to both the yellow and blue pixels, 402 and 406, respectively. Finally, as illustrated by FIG. 4C, for each pixel in $C_1(p_0)$ (412, 414, and 416), its three nearest neighbors are added to $C_4(p_0)$. Note that for purposes of clarity, only the three nearest neighbors (420, 422, and 424) of $p_1$ 412 are illustrated.

Figure 4B:
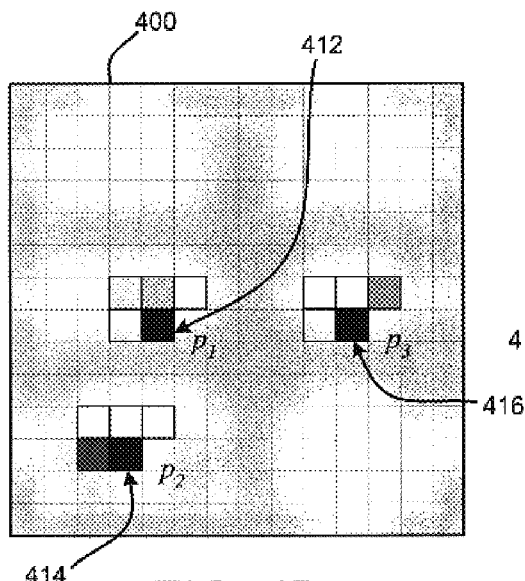
Figure 4C:
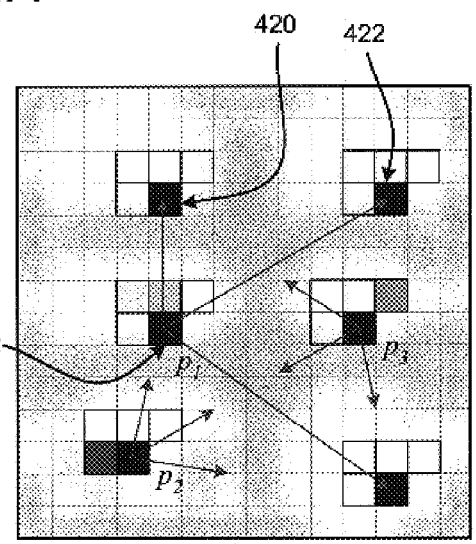

In particular, with respect to the two-dimensional texture case, suppose a pixel $p_0$ of $I_{out}$ is to be synthesized based on the already synthesized pixels in a neighborhood $N(p_0)$ of $p_0$ as is illustrated with respect to FIG. 4A through FIG. 4C, as described above. Every synthesized pixel $p_s$ in $N(p_0)$ corresponds to a pixel $p_1$ in the input sample texture $I_{in}$. $p_1$ is called a "coherence candidate" for $p_0$ because it is a good candidate according to the coherence of $I_{out}$: a pixel that is appropriately "forward-shifted" with respected to a pixel already used for synthesis is well-suited to fill in $p_0$. The coherence candidates are collected in $C_1(p_0)$, the coherence candidate set. Note that the concept of "forward shifting" is known to those skilled in the art, and is discussed briefly below in Section 3.4.2 with respect to FIG. 3C.

Next, the k-coherence search constructs the candidate set $C(p_0)$ as the k-coherence candidate set $C_k(p_0)$, which is formed by adding, for each pixel $p_1$ of $C_1(p_0)$, a set of pixels $\{p_1, \ldots, p_k\}$ of $I_{in}$ such that the newly-added pixels are closer to $p_1$ than any other pixels in $I_{in}$ by the neighborhood distance. The idea of k-coherence search is to speed up the search by guiding it to pixels of $I_{in}$ that are close to the coherence candidates according to the neighborhood distance. The validity of this guidance is shown by the Markov property, since whether a pixel is an eligible candidate is completely determined by pixels in its surrounding neighborhood. If the coherence candidates are suitable to fill $p_0$, then pixels close to the coherence candidates by the neighborhood distance are also good candidates for $p_0$.

The k-coherence search is fast because the k-coherence candidate set is much smaller than that of the full search and it can be constructed very quickly with the pre-computed list of k nearest neighbors for each pixel of $I_{in}$. Note that in a tested embodiment of the BTF synthesizer $k \leq 11$ was found to provide good search results. Further, it was noted that when k=11, the results of the k-coherence search are practically the same as those provided by the full search. However, as k decreases, the results look less and less like that of the full search. Further, if the BTF sample resembles a "natural" texture, setting k=1 for the k-coherence search provides good texture synthesis results.

For a small $I_{in}(\leq 64 \times 64)$, the k nearest neighbors of every pixel of $I_{in}$ can be pre-computed fairly quickly by an exhaustive search in $I_{in}$. However, for a large $I_{in}(>64 \times 64)$, a two-level pyramid is built to speed up the pre-processing of lists of k nearest neighbors for all pixels in $I_{in}$. Specifically, to compute the k nearest neighbors of a pixel p(a,b), m initial candidates are first computed for p(a/2,b/2) in the low-resolution version of $I_{in}$, where m=100 in a tested embodiment of the BTF synthesizer.

For each initial candidate in the low-resolution version of $I_{in}$, its four corresponding pixels in $I_{in}$ are added to the set of initial candidates in $I_{in}$. After all 4*m initial candidates are generated, the k nearest neighbors of pixel p are found from these initial candidates. An important advantage of the k-coherence search is that its pyramid-based acceleration also works for surface textons. For the k-coherence search, the low-pass filtering needed for pyramid-based acceleration only takes place on the two-dimensional texton map $t_{in}$. The texton pyramid constructed for multi-resolution synthesis can also be used for building the list of the k nearest neighbors. As a result, there is no need to low-pass filter the surface textons during the surface texton map synthesis. Low-pass filtering surface textons is a hard operation to define because surface textons have no appearance vectors.

3.4.2 Forming a Candidate Set on Surfaces:

In view of the preceding discussion, the construction of the k-coherence candidate set $C_k(v)$ for a mesh vertex v can now be described. In particular, let $\{v_i, \ldots, v_{in}\}$ be the set of all vertices in the flattened patch P(v) whose surface textons have been synthesized. As shown in FIG. 3C, vertex v, 360 has texture coordinates $(s_i,t_i)$ and an offset $(x_i,y_i)$ from vertex v 305 in the patch P(v) 315. Specifically, vertex v at position$(s_i,t_i)$ is forward-shifted by the offset $(x_i,y_i)$ in the two-dimensional texton map $t_{in}$, getting to location $(s_i',t_i')=(s_i-x_i,t_i-y_i)$ in $t_{in}$. Next, the list $L_t$ of k nearest neighbors at the pixel closest to $(s_i',t_i')$ is retrieved. Note that the candidate set $C_k(v)$ consists of all k nearest neighbors in all the lists $L_1$ through $L_m$.

In multi-resolution synthesis, a list of k nearest neighbors is built for each pixel of the texton map at every level. For example, in the second pass of a two-pass synthesis, a two-level neighborhood is also used when building the list of the k nearest neighbors for every pixel so that the neighborhoods on the side of the texton pyramid are consistent with the two-level neighborhoods on the side of the mesh pyramid.

3.5 Surface BTF Rendering:

Given the surface texton map $t_{out}$ and the sample BTF T, the BTF is efficiently rendered on the target mesh M as follows. First, the viewing and lighting directions are computed for each mesh vertex v in its local texture coordinates frame from the given light source location and the viewpoint. Vertices occluded from either the light sources or the viewpoint are simply ignored. Next, a set of nearby images are found from the BTF sample T. Finding the nearest images from the sample BTF T is simple because the images in T are evenly distributed in the viewing and lighting space. Specifically, the four nearest sample viewing directions, and the four nearest sample lighting directions are first separately identified. The angle between two lighting/viewing directions is then used as a distance measure. The 4×4 nearest images are simply those corresponding to all combinations of the viewing/lighting directions found in the previous step. Using v's texture coordinates; the colors from corresponding pixels in this set of images are simply looked up and blended to get the color of v. With all vertex colors obtained, the mesh is then rendered for storage or display, as desired. This procedure is then repeated for every novel lighting/viewing configuration.

4.0 System Operation:

As noted above, the program modules described in Section 2.2 with reference to FIG. 2, and in view of the detailed description provided in the preceding Sections, are employed in a "BTF synthesizer" which serves to synthesize a BTF on an arbitrary surface given a sample BTF as an input. This general process is depicted in the flow diagram of FIG. 5, and in greater detail in the flow diagram of FIG. 6. It should be noted that the boxes and interconnections between boxes that are represented by broken or dashed lines in both FIG. 5 and FIG. 6 represent alternate embodiments of the BTF synthesizer, and that any or all of these alternate embodiments, as described below, may be used in combination with other alternate embodiments as described throughout this document.

Figure 5:
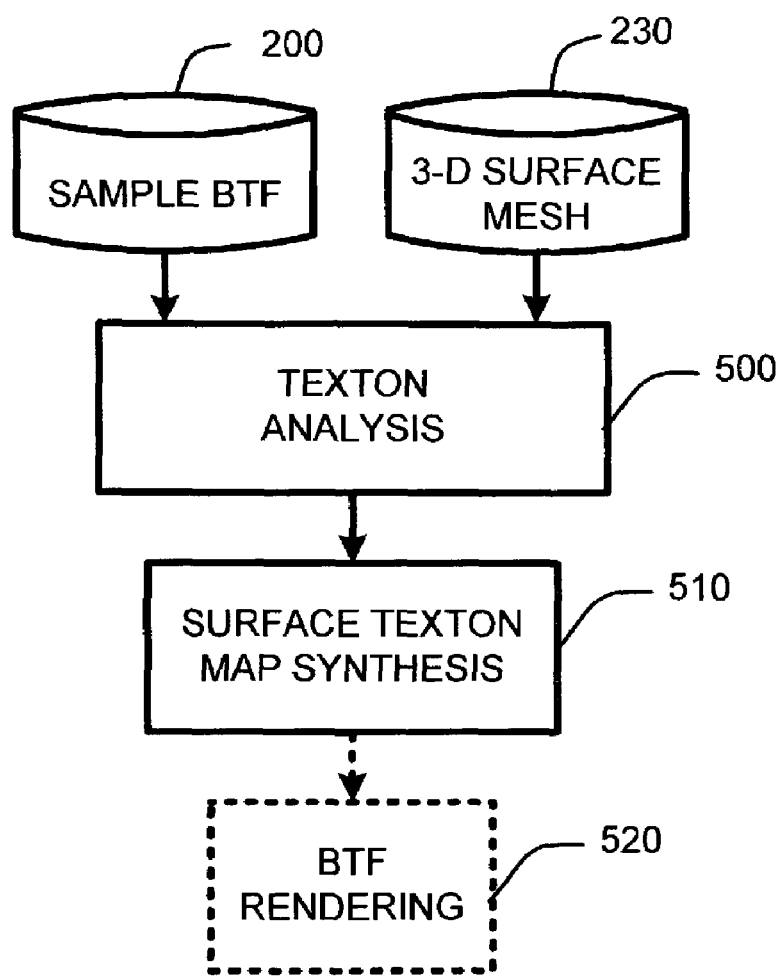
FIG. 5 illustrates an exemplary system flow diagram for surface BTF rendering.

Referring now to FIG. 5 in combination with FIG. 2, the process can be generally described as system for synthesizing a BTF on an arbitrary surface given a sample BTF as an input. In general, as illustrated by FIG. 5, the BTF synthesizer begins by performing a texton analysis 500 of a sample BTF 200 in view of a three-dimensional surface mesh 230. The results of this texton analysis 500 are then used in a surface texton map synthesis 510 operation which creates a surface texton map that is then useful for rendering 520 a BTF on the three-dimensional surface mesh 230 given desired lighting and viewing directions.

Figure 6:
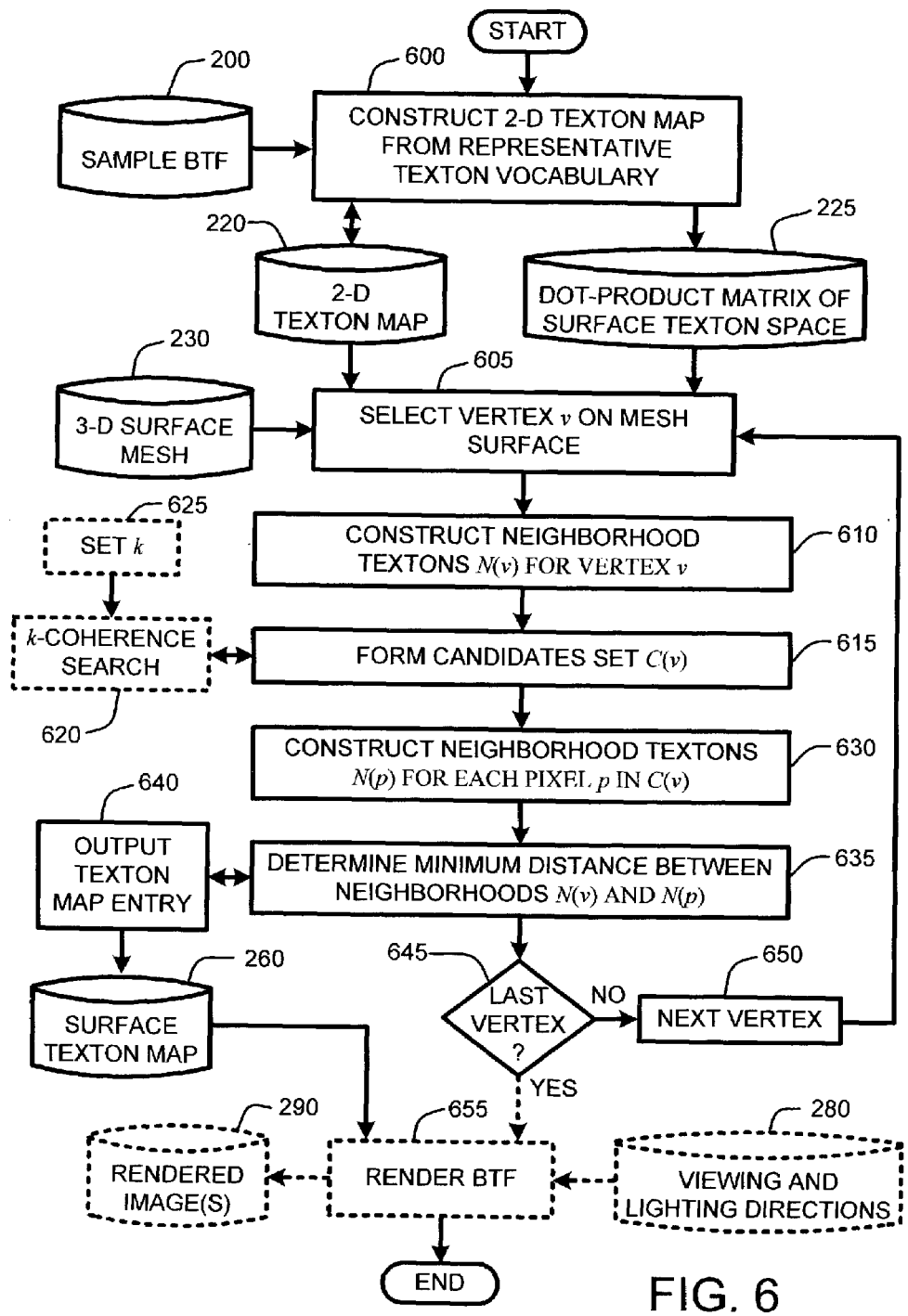
FIG. 6 illustrates an exemplary system flow diagram of a tested embodiment for surface BTF rendering.

This general description of the system operation is expanded with respect to the detailed flow diagram represented by FIG. 6. In particular, as illustrated by FIG. 6, the BTF synthesizer begins operation by first constructing 600 a two-dimensional texton map (or "sample texton map") 220 and a dot-product matrix 225 of the surface texton space from the sample BTF 200.

Given the sample texton map 220 and the dot-product matrix 225, the next step is to iteratively process each vertex v of the three-dimensional surface mesh 230 to construct neighborhood textons N(v) for each vertex v 610. Given the neighborhood textons N(v) for a particular vertex, the next step is to form a candidate set C(v) 615. As discussed above, this candidate set C(v) consists of candidate pixels for v in the sample texton map 220. Note that in one embodiment, construction of the candidate set C(v) is accelerated by a k-coherence search 620, wherein the number of candidates k are user adjustable 625 in one embodiment.

In either case, whether the candidate set C(v) is constructed 615 from a full search, or as a result of a k-coherence search 620, the next step is to construct neighborhood textons N(p) for each pixel p in the candidate set C(v) 630. Next, given the neighborhood textons N(v), and the neighborhood textons N(p) the distance between the elements of the two sets of neighborhoods is determined, with the neighborhoods having the minimum distance being selected as representing a best match. Once the best matched pixel in the sample texton map is determined by finding the minimum distance, the texton label and texture coordinates for that pixel are output 640 and copied to the pixel at the current mesh vertex for the pixel-by-pixel synthesis of the surface texton map 260.

As noted above, synthesis of the surface texton map 260 is an iterative pixel-by-pixel process. Consequently, once the texton map entry has been output 640 for a particular mesh vertex, the next step is to determine whether that vertex is the last vertex 645 of the mesh. If it is the last vertex, then the surface texton map 260 is complete, and it can be used to render the BTF 655 to the three-dimensional surface mesh 230 given desired viewing and lighting directions 280. The rendered image or images 290 are then either stored to a computer readable medium, or provided to a conventional display device, as desired. If the current vertex is not the last vertex 645, then the next vertex 650 in the mesh 230 is simply selected, and the above-described process repeated to provide the next entry to the surface texton map 260.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically synthesizing a texton map on a three-dimentional mesh surface, comprising:
providing a sample bidirectional texture function (BTF);
generating a two-dimensional texton map from the sample BTF;
computing a dot-product matrix representing a surface texton space from the sample BTF;
providing a three-dimensional mesh representing a three-dimensional surface; and
iteratively synthesizing a surface texton map for the three-dimensional mesh from the two-dimensional texton map and the dot-product matrix.

2. The system of claim 1 further comprising using the surface texton map to synthesize an output BTF on the three-dimensional mesh.

3. The system of claim 1 further comprising rendering the BTF to the mesh surface given desired viewing and lighting directions.

4. The system of claim 1 wherein generating the two-dimensional texton map comprises:
constructing a three-dimensional "texton vocabulary" comprised of three-dimentional textons representing prototype surface texture patches from the sample BTF; and
assigning a representative entry from the texton vocabulary to each pixel of the sample BTF to construct the two-dimensional texton map.

5. The system of claim 1 wherein computing the dot-product matrix comprises:
constructing a three-dimensional "texton vocabulary" comprised of three-dimentional textons representing prototype surface texture patches from the sample BTF; and
computing a dot-product of every pair of three-dimensional textons in representative entries constructed from the three-dimensional texton vocabulary.

6. The system of claim 1 wherein iteratively synthesizing the surface texton map for the three-dimensional mesh comprises:
identifying a first neighborhood of textons for each vertex of the three-dimentional mesh;
forming a candidate set of potentially matching neighborhood textons;
identifying a second neighborhood of textons for each pixel in the candidate set;
determining a minimum distance between textons in the first neighborhood and textons in the second neighborhood in the candidate set; and
iteratively synthesizing the surface texton map by assigning a texton label and texture coordinates to each vertex based on the minimum distance.

7. The system of claim 6 wherein forming the candidate set is accelerated by using a k-coherence search.

8. The system of claim 7 wherein the k-coherence search pre-computes k candidates for each neighborhood texton of the pixels in the two-dimensional texton map.

9. The system of claim 8 wherein the number candidates identified by the k-coherence search is adjustable.

10. A computer-implemented process for automatically synthesizing a bidirectional texture function on a surface, comprising using a computing device to:
input a sample bidirectional texture function (BTF);
construct a two-dimensional texton map and a corresponding surface texton space from the sample BTF;
provide a three-dimensional mesh representing a three-dimensional surface;
iteratively synthesize a surface texton map for the three-dimensional mesh from the two-dimensional texton map and the corresponding surface texton space; and
iteratively synthesize a BTF on the three-dimensional mesh from the surface texton map.

11. The computer-implemented process of claim 10 wherein constructing the two-dimensional texton map comprises constructing a three-dimentional texton vocabulary from the sample BTF, and assigning a representative entry from the texton vocabulary to each pixel of the sample BTF to synthesize the two-dimensional texton map.

12. The computer-implemented process of claim 10 wherein the surface texton space is represented by a matrix of dot-products computed between pairs of three-dimensional textons comprising representative entries in a three-dimensional texton vocabulary constructed from the BTF.

13. The computer-implemented process of claim 10 wherein iteratively synthesizing the surface texton map for the three-dimensional mesh comprises:
identifying a first neighborhood of textons for each vertex of the three-dimentional mesh;
forming a candidate set of potentially closely matching neighborhood textons;
identifying a second neighborhood of textons for each pixel in the candidate set;
determining a minimum distance between textons in the first neighborhood and textons in the second neighborhood in the candidate set; and
iteratively synthesizing the surface texton map by assigning a texton label and texture coordinates to each vertex based on the minimum distance.

14. The computer-implemented process of claim 13 wherein forming the candidate set is accelerated by using a k-coherence search which pre-computes k candidates for each neighborhood texton of the pixels in the two-dimensional texton map.

15. The computer-implemented process of claim 14 wherein the number of candidates, k, is user adjustable.

16. The computer-implemented process of claim 10 further comprising rendering the BTF to the three-dimensional mesh given desired viewing and lighting directions.

17. A computer program stored in a computer's memory, which when executed causes the computer to process data for automatically synthesizing a bidirectional texture function for use in texturing arbitrary surfaces, by executing instructions for:
building a texton vocabulary of three-dimensional textons from a sample bidirectional texture function (BTF);
constructing a two-dimensional texton map by using the texton vocabulary to assign representative texton labels to the pixels of the sample BTF;
constructing a surface texton space by computing a dot-product matrix from pairs of three-dimensional textons constructed from the representative texton labels from the texton vocabulary and discarding associated appearance vectors;
identifying a first neighborhood of textons for each vertex of a three-dimentional mesh;
forming a candidate set of potentially closely matching neighborhood textons;
identifying a second neighborhood of textons for each pixel in the candidate set;
determining a minimum distance between textons in the first neighborhood and textons in the second neighborhood in the candidate set; and
iteratively synthesizing a surface BTF by assigning a texton label and texture coordinates to each vertex based on the minimum distance.

18. The computer program of claim 17 further comprising rendering the BTF to an arbitrary surface represented by a three-dimensional mesh given desired viewing and lighting directions.

19. The computer program of claim 17 further comprising accelerating the formation of the candidate set by performing a k-coherence search for pre-computing k candidates for each neighborhood texton of the pixels in the two-dimensional texton map.

20. The computer program of claim 19 wherein the number of candidates, k, is user adjustable.

* * * * *